Dec. 25, 1956 L. W. FOSKETT ET AL 2,775,160
APPARATUS FOR ABSORPTION SPECTRA ANALYSIS
Filed Nov. 26, 1952 5 Sheets-Sheet 1
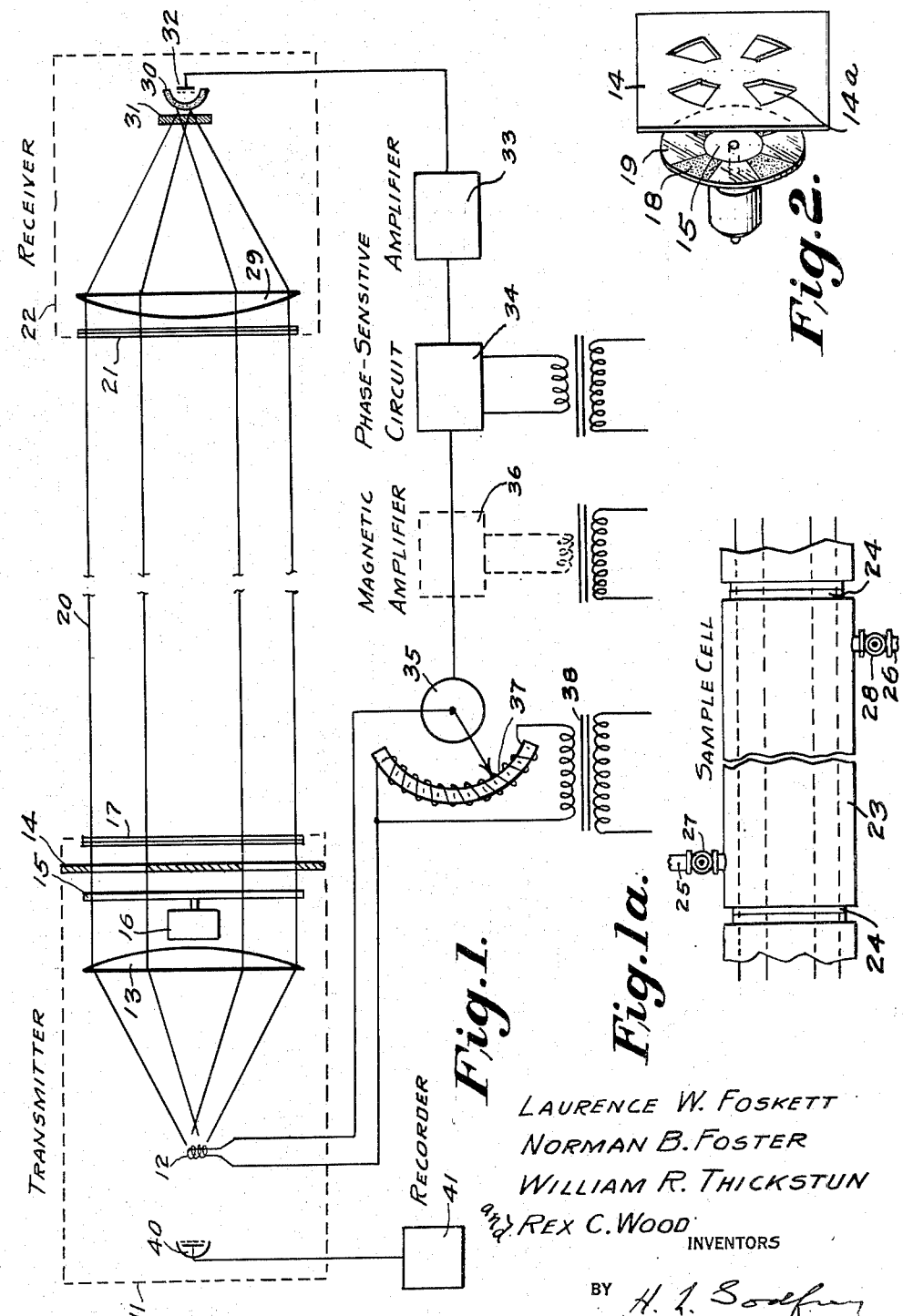
LAURENCE W. FOSKETT
NORMAN B. FOSTER
WILLIAM R. THICKSTUN
and REX C. WOOD
INVENTORS
BY *H. L. Soelfrey*
ATTORNEY Dec. 25, 1956 L. W. FOSKETT ET AL 2,775,160
APPARATUS FOR ABSORPTION SPECTRA ANALYSIS
Filed Nov. 26, 1952 5 Sheets-Sheet 2
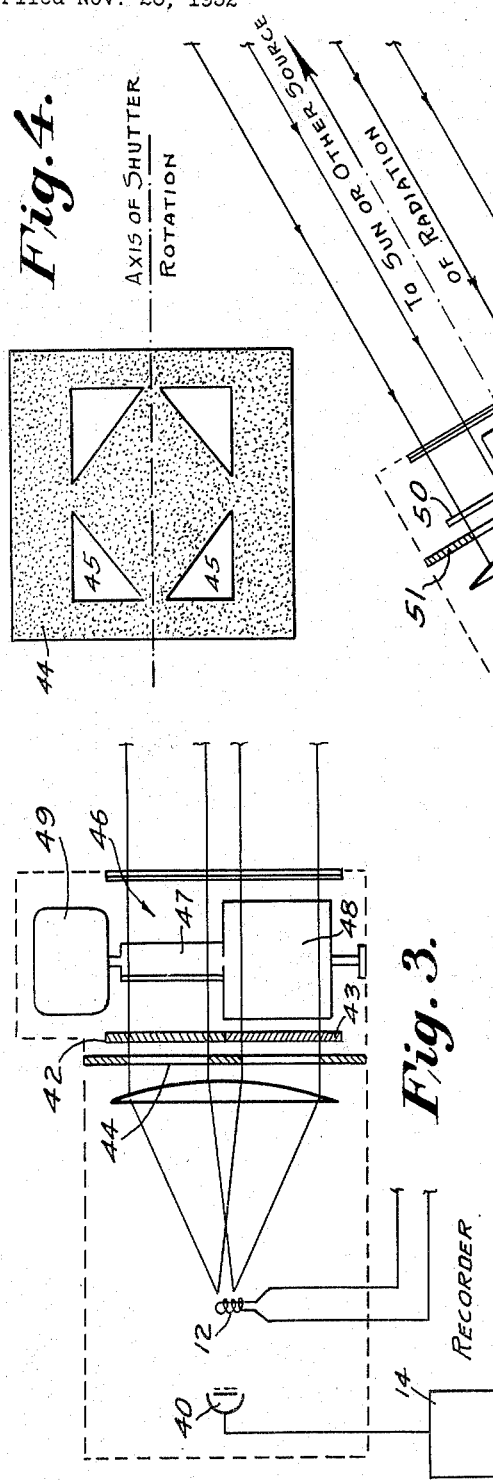
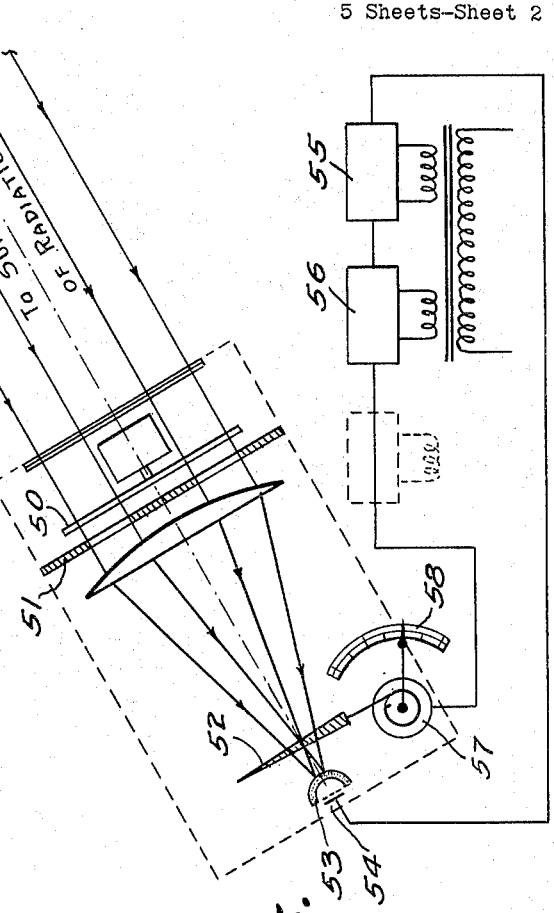
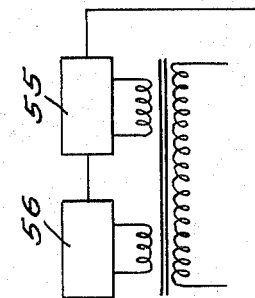
LAURENCE W. FOSKETT
NORMAN B. FOSTER
WILLIAM R. THICKSTUN
and REX C. WOOD
INVENTORS
BY
ATTORNEY

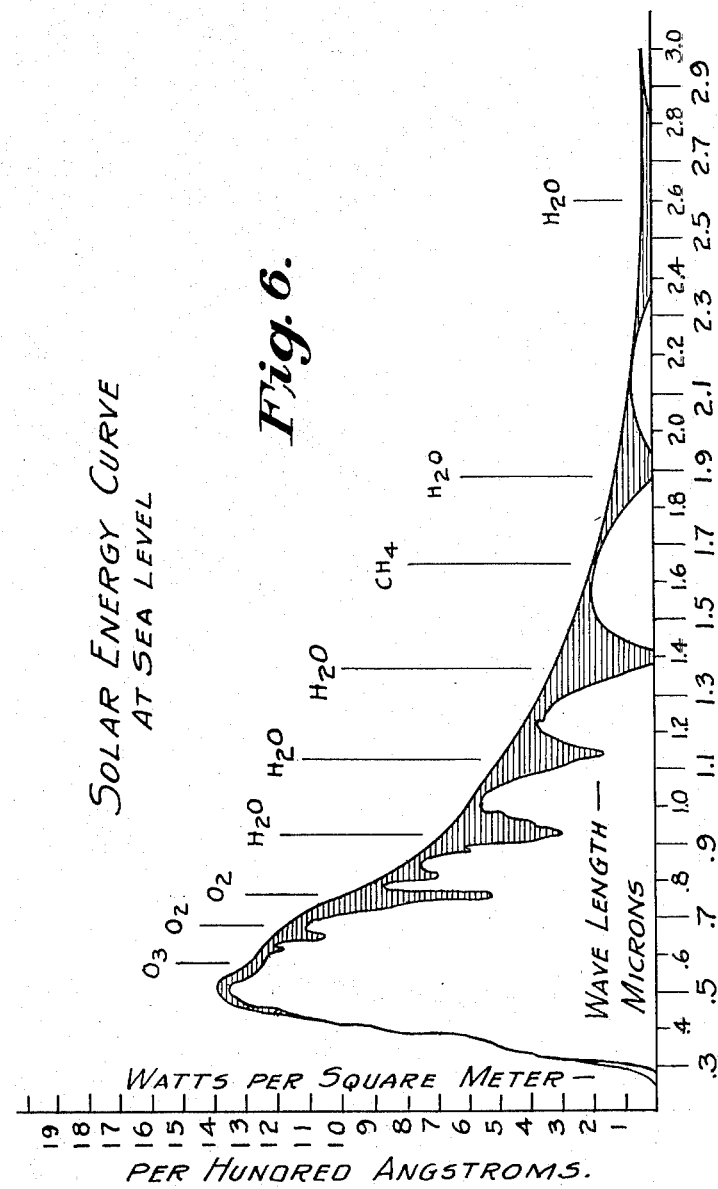

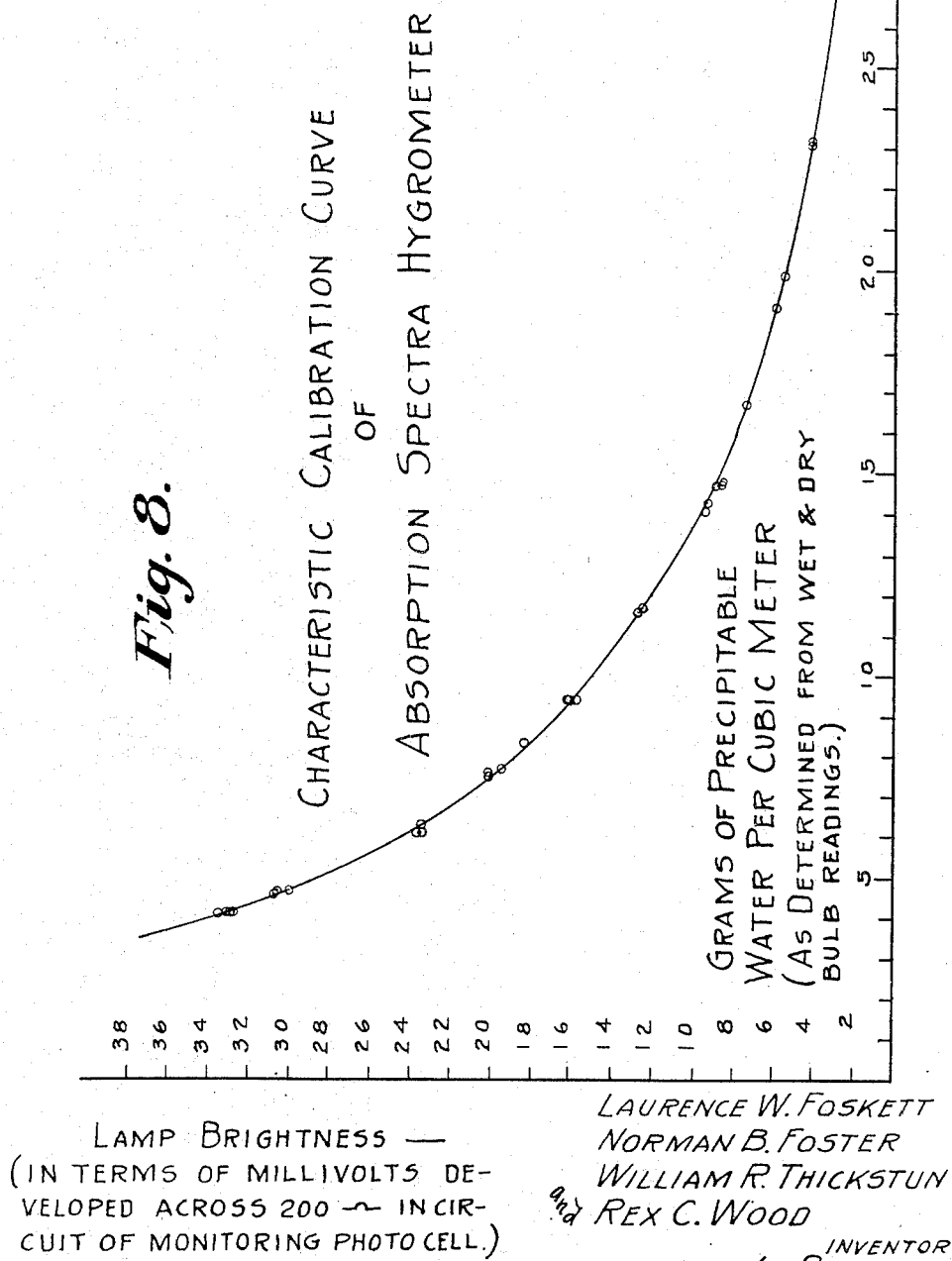

ically may be qualitatively determined.

United States Patent Office 2,775,160
Patented Dec. 25, 1956

2,775,160

APPARATUS FOR ABSORPTION SPECTRA ANALYSIS

Laurence W. Foskett, Washington, D. C., Norman B. Foster, Falls Church, Va., William R. Thickstun, Washington, D. C., and Rex C. Wood, Rockville, Md., assignors to the United States of America as represented by the Secretary of Commerce Application November 26, 1952, Serial No. 322,837

3 Claims. (Cl. 88—14)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to analytical apparatus, and more particularly, relates to absorption spectra apparatus for the detection and measurement of atmospheric water vapor or other selected gases or constituents in the atmosphere or in other media.

The property of certain materials to absorb particular wave lengths of radiant energy has been utilized heretofore to detect their presence or to measure their concentration in gases, liquids, or solids. Thus, for example, a sample gas may be placed in a cell in the path of a beam of light. By determining the extent of absorption by the sample of those wave lengths known to be absorbed by a constituent of the gas to be analyzed and by comparison of the extent of this absorption with the extent of absorption of reference samples containing known quantities of the particular constituent, the concentration of the particular material can be qualitatively determined.

An object of this invention is to provide an improved apparatus for quickly and accurately analyzing materials in accordance with absorption spectra principles.

Another object of this invention is to provide improved absorption spectra analytical apparatus utilizing band-pass radiation filters to isolate the areas of the electromagnetic spectrum pertinent to the material to be measured.

Another object of this invention is to provide improved absorption spectra analytical apparatus for quickly and accurately determining changes in the quantity of a constituent of a material subjected to continuous analysis.

Another object of this invention is to provide an improved null system for accurately and instantaneously evaluating changes in the quantity of a constituent of material subjected to continuous absorption spectra analysis.

Another object of this invention is to provide a device which can instantly sample any desired path length of a gas to be measured, from a few inches to thousands of feet.

Another object is to provide a device which will measure atmospheric water vapor or any other gas without changing the state of the sample or in any way adding or subtracting water or other liquid to the sample being measured.

Another object to provide a device which will measure water vapor or other gas at temperatures below the freezing point of water instantly and with the same or greater degree of accuracy as above the freezing point.

The term "light" as used herein is construed to refer to radiant energy from any part of or all of the electromagnetic spectrum including the ultraviolet, visible, and infrared portions of the spectrum.

In accordance with the invention, apparatus is provided whereby a beam of light from a suitable source is directed through a sample or through the atmosphere and upon a detector responsive to rapid changes in light intensity, and the light beam is broken up into two rapidly oscillating groups of light waves one of which is subject to absorption by the material to be analyzed and the other of which is unaffected by the material to be analyzed. The light energy striking the detector is converted to an electrical signal the strength of one component of which is constant for a given light intensity at the light source and the other of which varies as a function of the concentration of the material being analyzed. The signal from the detector is evaluated to thereby indicate the concentration or mass of the material in question in the sample.

A preferred embodiment of this feature of the invention, and one that affords the highest degree of accuracy, comprises the use of rotating band pass filters for breaking the light beam into alternating groups of light waves. In accordance with this embodiment, a collimated light beam is chopped by a rotating sector wheel. The wheel is constructed of alternate sectors of two appropriate narrow band-pass light filters. By means of this rotating sector wheel, the light beam is broken up into two rapidly oscillating groups of light waves, one group of which is subject to attenuation by the water vapor or other gas in the light path, and is designated hereafter as the absorption band, while the other group is located in the spectrum where the energy is unaffected by the gas to be analyzed, and is designated hereafter as the reference band. This alternating beam is focused on an appropriate light sensitive cell. Since the filter sectors alternately chop the light beam the signal generated by the cell may be thought of as consisting of two components, one 180 electrical degrees out-of-phase with respect to the other. When the two components of the signal are 180 degrees out-of-phase and equal in intensity, one exactly balances the other and no resulting signal is observed. If, however, one component is more intense than the other, a signal results which has a predominate phase, depending on which component of the signal is stronger. If the reference band signal is stronger, the phase is one way; if the absorption band is stronger, the phase is opposite.

When the two components are balanced and a particular gas under analysis is allowed to enter the light sensing beam, the energy in the absorption band is decreased due to the gas absorption while the energy in the reference band remains constant. A signal develops as a result of the unbalance which may be used as an index of the quantity or mass of gas existing in the radiation path.

This signal can be evaluated by any suitable means, such as a deflection meter, a deflection bridge, a null method, recording potentiometer, or a recording milliammeter.

An alternative arrangement for breaking up the light beam comprises the use of a split beam sensing path. According to this method, a collimated light beam is effectively split into two parts by placing two appropriate narrow band-pass light filters side by side in the sensing beam. One filter passes only radiation which is subject to attenuation by the water vapor or other gases in the radiation path, while the other filter passes a band of radiation which is insensitive to the gas being analyzed. These two beams are rapidly interrupted by means of a rotating light chopper. The chopper can be of the paddle wheel type having two opaque blades oriented 90 mechanical degrees to each other, or it can be of the sector type fitted with appropriate openings and so arranged in front of a diaphragm so that an alternating beam is allowed to pass, one component of which is composed of energy located in the reference band and the other component composed of energy subject to attenuation by the gas being analyzed. The two parallel chopped beams are mixed and brought to focus on an appropriate light-sensitive cell. Since the two lightbeams are alternately chopped the signal generated by the light-sensitive cell consists of two components 180 electrical degrees out-of-phase with respect to each other. The description of this method from this point is identical to the method used in the preferred embodiment of the invention.

An important feature of the invention comprises the use of a novel and highly accurate form of null system for evaluating the signal from the detector. This system can be employed in combination with either of the band-pass filter systems described above. In accordance with the novel null method of this invention, the two components of the light beam are balanced by merely changing the temperature of the light source. As is well known, the wave length of maximum energy for a radiating black body or gray body varies inversely as its absolute temperature. This relationship of wave length at maximum energy to temperature is defined by Wiems displacement law and is depicted by the so-called Planck radiation curve. Since, therefore, it is possible within limits to change the ratio of the energy between two wave lengths or groups of wave lengths, it is possible to maintain a balance between the energy of the reference and absorption bands by merely changing the temperature of the light source. It follows, therefore, that it is possible by this means to get a relationship between some function of the temperature of the radiation source, and the amount of water vapor or other gas existing in the radiation path of the equipment. This relationship can be established, for example, by calibrating lamp current, lamp voltage, total radiation, or light intensity, against known concentrations of the material to be analyzed. A preferred method, in accordance with this invention, consists of measuring the light intensity by means of a photoelectric cell. A gain of sensitivity of many times over the current or voltage meter-method is obtained by the use of a selenium barrier-layer cell. The cell is placed in the light field of the radiation source but out of the direct light path through the instrument. This light cell response is in turn measured by means of a microammeter, potentiometer, or a recording potentiometer, and the values obtained may be used as a direct measure of analyzable material.

Another feature of this embodiment of the invention is to control the temperature of the radiation source to maintain a continuous balance of the energy between the absorption and reference bands. This may be accomplished in any desired manner but from the standpoint of speed and accuracy automatic control is preferred. There are available commercially electronic phase-sensitive amplifiers fitted with a small balancing motor. If an alternating signal consisting of two components 180 electrical degrees out-of-phase is fed into this type of amplifier, the motor will turn one way or the other depending on which component has the greater magnitude. If the two components of the signal are equal in magnitude the motor does not turn. This device is utilized by the present invention to drive a variable autotransformer so as to automatically set the radiation source voltage of the instrument to a value which balances the energy of the two components of the beam. When an unbalance occurs because of gas absorption in the sensing beam, the motor turns the variable transformer in the proper direction to vary the lamp voltage until balance is again restored. By means of this arrangement, a continuous automatic balance is maintained between the reference and absorption band energy components. Thus, there is obtained a continuous record of the concentration of analyzable material in the sensing path without the necessity of personal supervision or manual adjustment of the equipment.

A further embodiment of the invention utilizes the sun or some other uncontrollable source of radiant energy as the light source. This method is especially applicable for determining the amount of water vapor or other gases in the earth's atmosphere over considerable distances. The preferred method of breaking up the light beam, as described above, is utilized in this embodiment of the invention. Thus, a collimated beam of light is chopped by a rotating sector wheel. The chopped beam is focused on an appropriate light-sensitive cell. As in the previous methods, the energy in the absorption band is balanced against the energy in the reference band. If now the total quantity of the gas being measured changes in the light sensing path through the atmosphere, an unbalance is produced which will appear in the form of a signal from the cell. As in the previous methods, this signal will have a predominate phase depending on whether the reference or the absorption band energy is the more intense. In using this method, a balance is re-established by imposing an optical wedge in the light path preferably close to the point of focus. The wedge used has a differential transmission with respect to the absorption and the reference bands in question. The balance is achieved automatically by means of a similar electronic phase sensitive amplifier and motor as described above except in this case the motor drives the optical wedge into or out of the light beam until a balance is re-established. In using this method, a relationship is established between the amount of gas in the light path and the position of the wedge at balance. This relationship is obtained by a direct linear measurement of the wedge displacement, and if recording is desired, a potentiometer is attached mechanically to the wedge driving mechanism. The potentiometer is in turn connected to an appropriate recorder.

The invention will be described in greater detail in conjunction with the drawings, in which:

Fig. 1 is a diagrammatic illustration of a preferred embodiment of the invention.

Fig. 1(a) is a diagrammatic illustration of a modification of a part of the system shown in Fig. 1 showing a sample cell in the optical sensing path.

Fig. 2 is a perspective view showing in greater detail the light chopping means of the apparatus used in Fig. 1.

Fig. 3 is a diagrammatic illustration of a modified light chopping system.

Fig. 4 is a front view showing in greater detail a part of the apparatus employed in the system of Fig. 3.

Fig. 5 is a diagrammatic illustration of another embodiment of the invention for use with a noncontrollable light source.

Fig. 6 is a chart showing the location in the electromagnetic spectrum of some of the absorption bands of a few of the more common gases.

Fig. 8 is a chart showing a calibration curve for determination of water vapor in the atmosphere using the apparatus of this invention as a hygrometer.

Figure 7:
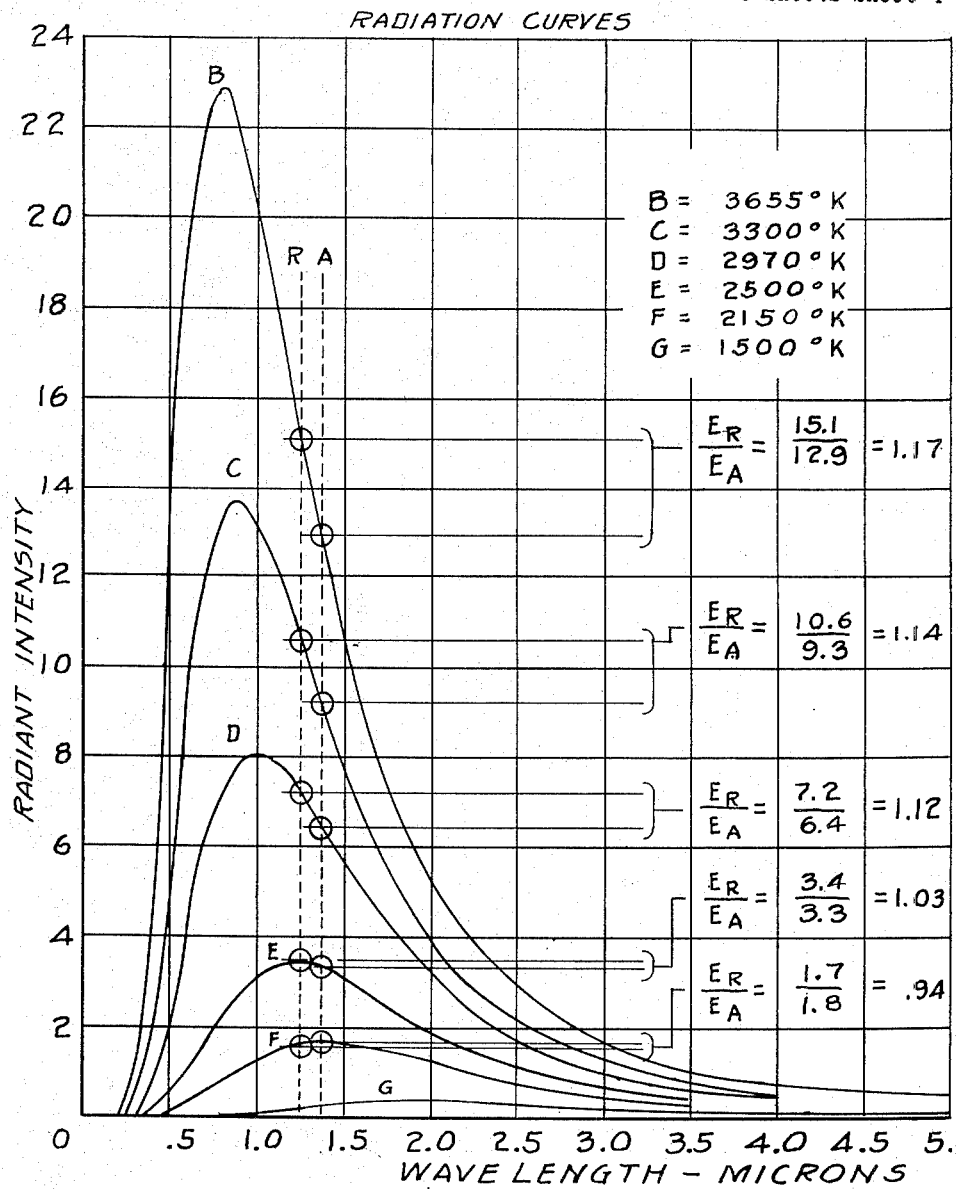
Fig. 7 is a chart showing black body radiation curves.

Referring now to Fig. 1, a gas-tight compartment, shown diagrammatically at 11, houses the transmitting part of the apparatus, which comprises a suitable light source such as lamp 12, collimating lens 13, diaphragm 14, filter sector wheel 15, and synchronous drive motor 16. A cover plate 17 encloses the front of the compartment 11. This plate is preferably composed of filter glass which cuts out as much of the total radiation as possible of wave lengths shorter than the shortest wave length passed by either set of filters of the sector wheel and attenuates the energy through the band-pass regions as little as possible. The compartment 11 may be either evacuated or pressurized with a gas non-absorptive of light waves.

The electric lamp 12 may have a prefocused type of mounting. The filament preferably is of small physical dimensions, but of heavy gauge to minimize flicker and to insure long life.

As shown more particularly in Fig. 2, the sector filter chopper wheel 15 consists of alternate sectors, 18 and 19, of narrow band-pass light filters. One set of filters, as 18, passes a band of wave lengths centered in a region of the electromagnetic spectrum where absorption occurs due to water vapor or other gas to be measured, and the other set of sectors 19 passes a band of wave lengths in a region unaffected by the gas in question. The region of transmission of the reference filters should be centered as close as practicable to the region of absorption.

As a further illustration of the proper selection of filter sectors, reference is made to Fig. 6 which shows the location in the electromagnetic spectrum of some of the absorpiton bands of a few of the more common gases. Deep water bands exists centered at: .93 micron, 1.13 microns, 1.37 microns, 1.87 microns, 2.6 microns, etc. Oxygen bands are centered at about .76 micron and .69 micron; ozone is centered in the visible at .59 micron; methane at 1.66 microns, etc. Absorption bands for other gases not shown in Fig. 6 are, for example, carbon dioxide centered at 2.79 microns and 4.7 microns; and carbon monoxide centered at 4.4 microns. The sector wheel 15 is constructed from alternate sectors of narrow band pass filters, one component having its transmission area or window centered over an absorption band of the gas to be analyzed, and the other component close to it, spectrally speaking, but out of the absorption area. For example, in the operation of a gas analyzer for measuring water vapor, the absorption filter component sectors of the sector wheel may be centered at 1.380 microns with a transmission at center of 32%, and a width at half energy of 59 millimicrons. The reference component sectors may be centered at 1.25 microns with a transmission at center of 35%, and a width at half energy of 57 millimicrons. When this sector wheel is used in conjunction with a Corning #7–56 infrared transmitting filter as the cover plate 17, all radiation in the visible spectrum is eliminated, and only the desired wave lengths pass through the combination. For analyzing ozone one filter component would be located at about .59 micron, in an ozone absorption band and the other filter at about .68 micron where no appreciable absorption exists. The same procedure would be followed for analyzing any other gas. For best results the absorption filter should not pass energy outside of the absorption area and the reference filter should not pass energy inside the absorption area.

The number of sectors to be used in the wheel is determined by the speed of the driving motor and the frequency of the alternating current amplifier in the receiver circuit. For example, if the amplifier is tuned to 60 cycles and the motor has a speed of 900 R. P. M., the sector wheel 15 must have four absorption filter sectors 18 and four reference filter sectors 19 placed alternately one to the other.

The diaphragm 14 has a number of symmetrically placed openings 14a equal to one-half the total number of sectors in the chopper wheel. These openings correspond in shape to the filter sectors and are in registry therewith. Light passing through the openings 14a is alternately chopped by absorption and reference filter sectors of the filter chopper wheel.

The optical sensing path, generally designated as 20, extending from the cover glass 17 of the transmitter equipment to the cover glass 21 of a receiving assembly compartment 22 may range in length from substantially zero distance to thousands of feet depending upon the application of the device to a particular use. The optical sensing path 20 may extend through the atmosphere, or through a suitable sample cell 23 such as shown in Fig. 1 (a). The sample cell 23 has windows 24 of a similar material as the window 17 of the transmitting device. Inlet line 25 and outlet line 26 provided with valves 27 and 28, respectively, permit the entrance and exit of the sample gas or liquid. The sample cell may be used for single, individual samples of materials to be analyzed or may be employed for continuous analysis by continuously passing the sample material through the cell. For solid samples, the cell would not be used as the solid would merely be placed in the optical sensing path. The optical path may be a straight line as shown with the transmitter located at one end and the receiver at the other, or, if desired, where the path is long, it can be folded back upon itself by means of a specular reflecting surface (not shown), so that the receiver is located in close proximity to the transmitter.

The receiving compartment 22 and cover glass 21 correspond generally to the transmitter. The optical qualities of the cover glasses are similar, and the compartments are similarly evacuated or pressurized by a nonabsorbing gas. The receiving compartment 22 houses a camera lens 29 similar to collimiating lens 13, a diffuser disc 30 of flat, cylindrical, or other suitable shape, a filter glass 31 designed to bring the intensity of the reference and absorption components into approximately equilibrium, and a light sensitive cell 32. The cell 32 can be of any suitable type, photo-conductive, photo-electric, balometer, thermocouple, etc., which is capable of responding to the wave lengths of radiation passed by the sector wheel at the desired frequency of modulation.

As aforestated, the signal from the light sensitive cell 32 may be evaluated by a number of means, such as by a deflection meter, a deflection bridge, a null method, recording potentiometer, recording milliameter, etc. The novel form of null method described above and found to be more sensitive and to give more highly accurate results than previously known means is used in the system shown in Fig. 1. The means for carrying out this method, comprise an electronic alternating current narrow-band amplifier 33 connected to light sensitive cell 32 and tuned to the desired chopping frequency. Amplifier 33 is in turn connected to a phase sensitive circuit 34 which is designed to control the direction of rotation of a balancing motor 35 depending upon the magnitude of the components of the alternating signal fed to it by amplifier 33. Since this signal depends upon the energy through the reference and absorption filters, the direction of rotation of the balancing motor 35 depends on whether the energy in the absorption area or in the reference area is predominate.

Where the chopping frequency of the filter wheel 15 is other than 60 cycles the phase sensitive circuit 34 is modified to produce a polarized D. C. which is fed into a magnetic amplifier, shown diagrammatically in broken lines at 36, which in turn drives the balancing motor 35 in one direction or the other depending on the direction of polarization.

The balancing motor 35 controls a variable autotransformer 37 which adjusts the voltage of lamp 12 and thereby balances the reference and absorption energy components in the sensing beam in response to signals from the detector cell 32. Power to supply the lamp 12 or other radiation source is provided by means of power transformer and voltage stabilizer 38. Power is similarly supplied to the amplifying and phase sensitive equipment.

The radiation intensity of the lamp 12 is measured by a suitable photo-electric cell 40 positioned in the transmitter housing 11. The response of this cell is an index of the mass of water vapor or other selected gas, or material in the light sensing path. The cell 40 is connected to a suitable recording instrument 41 for continuous indication and recording of the variations in cell response.

The embodiment of the invention shown in Fig. 3 is identical to that of Fig. 1 with the exception of the means for breaking up the light beam to isolate the areas of the electromagnetic spectrum pertinent to the measurement of the material to be analyzed. According to this modification, two appropriate narrow band-pass light filters are placed side by side in the sensing beam. Thus, a fixed narrow band-pass light filter 42 is designed to pass a group of frequencies centered in an appropriate absorption band. The band-pass width of this filter is about the same as the spectral absorption area in question. A narrow band-pass light filter 43 similar to the reference filter described in connection with the chopping wheel is placed in the light beam below the absorption filter 42. A diaphragm 44, shown in detail in Fig. 4, having openings 45 of such shape as to produce a sinusoidal variation of energy intensity when the light is chopped by a paddel wheel mechanism, generally shown at 46, is placed between the collimating lens and filters. The light chopping mechanism generally shown at 46 is of the form of a two blade paddle wheel having blades 47 and 48 locked 90° apart. The chopper blades are driven by means of a motor 49. An alternative chopping means (not shown) can be in the form of a sector wheel with appropriately spaced openings.

In the embodiment of the invention shown in Fig. 5 in which the sun or other noncontrollable radiation source is employed, a rotatable chopping filter wheel 50 and diaphragm 51 may be used similar to those employed in the transmitter of Fig. 1. In this modification, however, the chopping wheel is located in the receiving end of the system, and the energy balance is controlled by imposing an optical wedge 52 in the light path in the receiver preferably close to the point of focus. This wedge, which may also be known as a calibrating wedge, is a light filter having a differentiating absorption between the reference and absorption areas as used in the sector wheel. The wedge shape filter 52 may be either linear or circular and is of sufficient width to completely intersect the light beam of the apparatus. Its length depends upon the magnitude of the differential absorption between the two energy components in question and the percent of gas absorption to be compensated for in the sensing path. Light passing through the optical wedge 52 passes through a suitable diffusing disc 53 to a suitable photo-sensitive cell 54 which is capable of responding to wave lengths of radiation passed by the sector filter wheel 50 at the desired frequency of modulation. A balance between the signal components received by the cell 54 is achieved automatically by means of an electronic amplifier 55, phase sensitive circuit 56, and motor 57 similar to the units described in connection with Fig. 1. In this case, however, the phase sensitive motor 57 drives the optical wedge 52 into or out of the light beam until a balance is established. A relationship is thereby established between the amount of analyzable gas in the light path and the position of the wedge at balance. A graduated scale 58 may be used as a measurement of the wedge displacement. The amount of the displacement indicated is an index of the mass of gas in the light beam. The amount of wedge displacement may also be continuously recorded by attaching a potentiometer (not shown) mechanically to the wedge driving mechanism. The potentiometer in turn may be connected to an appropriate recorder.

As an illustrative example of practice, the system shown in Fig. 1 was used as a hygrometer for continuously recording the amount of water vapor in the atmosphere. An optical sensing path of 2 meters between the respective cover plates of the transmitting and receiving compartments was employed. For this length optical path the absorption sector filters were centered at about 1.380 microns with a transmission at center of 32% and a width at half energy of 59 millimicrons. The reference filter sectors were centered at about 1.26 microns with a transmission at center of about 35% and a width at half energy of 57 millimicrons.

To illustrate the effect of temperature of the light source upon the ratio of the energy emitted at the two selected wave lengths, and the manner in which change in the temperature of the light source is utilized by this invention, reference is made to Fig. 7 on which is shown a number of black body radiation curves derived by plotting energy of radiation against wave lengths for different temperatures. On this figure, $E_R$ represents the energy received at a wave length of 1.25 microns, the region where little or no water vapor absorption occurs; and $E_A$ represents the energy received at a wave length of 1.37 microns, a region of water vapor absorption. It will be noted that $E_R$ would balance $E_A$, i. e., the energies at these two wave lengths would be equal, at a temperature somewhere between 2500° K. and 2150° K., represented by the lines E and F, respectively. The ratio $E_R$ to $E_A$ diminishes as the temperature diminishes. If, at a temperature at which $E_A$ and $E_R$ are balanced, $E_A$ is decreased by reason of absorption of water vapor in the path of the energy received, it is readily seen that it is possible to restore the balance by decreasing the temperature of the energy source to again make $E_A$ equal to $E_R$.

It will be understood that the filter sectors may be centered at different absorption areas in the electromagnetic spectrum when optical paths of different lengths are employed. The filter sector wheel was made up of four absorption filters alternated spaced by an equal number of reference filters. The wheel was rotated at 900 R. P. M. and the receiver amplifier was tuned to 60 cycles.

The apparatus was adjusted in the laboratory by inserting a modifying filter glass (31) with characteristics which allowed the energy components reaching the amplifier from the photocell, to balance at some convenient value of lamp temperature. (The use of a modifying filter is necessary where the difference in transmission between the reference and absorption filters alone, is too great to allow the system to balance within a desired range of lamp temperature.) The instrument was then calibrated by varying the humidity step by step from about three grams of water per cubic meter, to about 28 grams per cubic meter. During this process, the automatic balancing feature of the apparatus constantly adjusted the level of lamp temperature to maintain the balance of energy components from the photocell. At each step the humidity was held constant long enough for a reading of the lamp brightness or intensity to be made as indicated by the recorder in the circuit of the monitoring photocell. At the same time, a psychrometer reading was taken in the vicinity of the light path. At each step lamp brightness was plotted against the absolute humidity as determined by means of the psychrometer. This resulted in a calibration curve such as shown in Fig. 8. It will be readily apparent that the recorder chart may be scaled so that absolute humidity as continuously recorded may be read directly from the chart. The apparatus instantly and accurately measures and indicates even the most minute variations in himidity conditions.

The analysis of other gases in the atmosphere, or in a sample contained in the sample cell, is made in a similar manner to that described with water vapor by merely changing the filter sectors to those centered in the appropriate portions of the spectrum.

An important use of the invention resides in the measurement of water vapor, oxygen, or other gases in the atmosphere from rapidly traveling aircraft. This is made possible through the instantaneous operation of the devices. The instrument also makes possible the determination of water vapor more accurately in the atmosphere at meteorological stations, and is particularly useful where the temperature of the atmosphere is so low that readings by the usual method are impossible. The device may also be used advantageously in gas analysis in the laboratory and in the field.

It will be appreciated from a reading of the foregoing specification that the invention herein described is susceptible of various changes and modifications without departing from the spirit and scope thereof.

We claim:

1. Apparatus for absorption spectra analysis comprising a light source, a detector positioned to receive a beam of light from said light source and capable of converting radiant energy into electrical energy, means for breaking said light beam into two rapidly oscillating groups of light waves one of which is absorbable by a constituent of the material to be analyzed and the other of which is not absorbable by this constituent, means for adjusting the temperature of the light source in response to an unbalance in the energy components at the detector due to the presence of absorbable material in the light path to thereby balance said energy components, and means for indicating changes in the intensity of said light source.

2. Apparatus for absorption spectra analysis comprising a lamp, a detector positioned to receive a beam of light from said lamp and capable of converting radiant energy into electrical energy, means for breaking said light beam into two rapidly oscillating groups of light waves one of which is absorbable by a constituent of the material to be analyzed and the other of which is not absorbable by this constituent, a variable autotransformer in the electrical circuit to said lamp, a reversible electric motor arranged to drive said autotransformer, means for amplifying and impressing the output of said detector on said reversible electric motor, said motor and autotransformer operating to vary the temperature of the lamp to thereby balance the energy components of the two group of light waves received by said detector, and means in the vicinity of said lamp for measuring the intensity of the light at the source.

3. Apparatus for absorption spectra analysis comprising a lamp, a photoelectric cell spaced from said lamp and positioned to receive a beam of light therefrom, a filter wheel interposed in the path of said light beam having a plurality of sectors, said sectors comprising light filters alternately disposed one of which is capable of passing a band of light waves centered in an absorption area of the spectrum for a constituent of the material to be analyzed, and another of which is capable of passing a band of light waves outside the absorption area of said constituent, means for rotating said filter wheel, a diaphragm having openings in registry with alternate filters sectors of said filter wheel, a variable autotransformer in the electrical circuit to said lamp, a reversible electric motor arranged to drive said autotransformer, means for amplifying and impressing the electrical signal from said photoelectric cell on said reversible motor, said motor and autotransformer operating to vary the temperature of the lamp to thereby balance the energy components of the two groups of light waves received by said photoelectric cell, a second photoelectric cell in the vicinity of said lamp to measure the intensity of the light at the source, and means responsive to said second photoelectric cell to continuously indicate the light intensity.

References Cited in the file of this patent

UNITED STATES PATENTS

| | | |
|---|---|---|
| 1,919,858 | Pettingill | July 25, 1933 |
| 2,166,824 | Runaldue | July 18, 1939 |
| 2,314,800 | Pineo | Mar. 23, 1943 |
| 2,327,539 | McAlister | Aug. 24, 1943 |
| 2,395,489 | Major et al. | Feb. 26, 1946 |
| 2,404,064 | Heigl et al. | July 16, 1946 |
| 2,439,373 | Stearns | Apr. 6, 1948 |
| 2,462,946 | Coggeshall et al. | Mar. 1, 1949 |
| 2,502,319 | Golay | Mar. 28, 1950 |
| 2,594,514 | Sweet | Apr. 29, 1952 |
| 2,673,297 | Miller | Mar. 23, 1954 |

FOREIGN PATENTS

| | | |
|---|---|---|
| 682,519 | France | Feb. 17, 1930 |
| 960,945 | France | Nov. 7, 1949 |
| 458,604 | Italy | July 25, 1950 |